(12) United States Patent
Mori et al.

(10) Patent No.: US 8,411,202 B2
(45) Date of Patent: Apr. 2, 2013

(54) AUTOMATIC GAIN CONTROL CIRCUIT IN VIDEO SIGNAL PROCESSING DEVICE

(75) Inventors: Hirotoshi Mori, Gunma-ken (JP); Hiroyuki Ebinuma, Fukaya (JP)

(73) Assignees: Sanyo Semiconductor Co., Ltd., Gunma (JP); Semiconductor Components Industries, LLC., Phoenix, AZ (US)

( * ) Notice: Subject to any disclaimer, the term of this patent is extended or adjusted under 35 U.S.C. 154(b) by 1156 days.

(21) Appl. No.: 12/249,528

(22) Filed: Oct. 10, 2008

(65) Prior Publication Data

US 2009/0096926 A1    Apr. 16, 2009

(30) Foreign Application Priority Data

Oct. 11, 2007    (JP) .................................. 2007-265255

(51) Int. Cl.
    H03M 1/12    (2006.01)
(52) U.S. Cl. ........................................ 348/572; 348/678
(58) Field of Classification Search .................. 348/572, 348/678, 752, 571
    See application file for complete search history.

(56) References Cited

U.S. PATENT DOCUMENTS

| | | | | |
|---|---|---|---|---|
| 3,790,706 A | * | 2/1974 | Gubala et al. .................. | 348/572 |
| 4,434,439 A | * | 2/1984 | Steckler et al. ................ | 348/572 |
| 4,642,694 A | * | 2/1987 | Yamagishi et al. ............ | 348/790 |
| 4,827,191 A | * | 5/1989 | Chapman ...................... | 341/132 |
| 5,210,610 A | * | 5/1993 | Kanashiki et al. ............. | 348/672 |
| 6,002,445 A | * | 12/1999 | Urayama ....................... | 348/572 |
| 6,195,133 B1 | * | 2/2001 | Bae ............................... | 348/678 |
| 6,219,107 B1 | * | 4/2001 | Renner et al. ................. | 348/678 |
| 6,518,998 B1 | * | 2/2003 | Christoff et al. ........... | 348/216.1 |
| 7,265,795 B2 | * | 9/2007 | Ohyama et al. ............... | 348/675 |
| 7,355,656 B2 | * | 4/2008 | Yoshida ......................... | 348/678 |
| 7,362,382 B2 | * | 4/2008 | Akiyama ....................... | 348/678 |
| 7,580,081 B2 | * | 8/2009 | Tamano et al. ............... | 348/678 |
| 7,589,795 B2 | * | 9/2009 | Wu et al. ....................... | 348/572 |
| 8,089,562 B2 | * | 1/2012 | Okada et al. .................. | 348/678 |

(Continued)

FOREIGN PATENT DOCUMENTS

JP    07015684 A  *  1/1995
JP     7015684 A     1/1995

(Continued)

OTHER PUBLICATIONS

Noide et al, Amplitude control circuit, Jan. 1995, Sony Corp. (NPL translation of JP 07015684A).*

(Continued)

*Primary Examiner* — Jefferey Harold
*Assistant Examiner* — Humam Satti
(74) *Attorney, Agent, or Firm* — Osha Liang LLP

(57) ABSTRACT

In an automatic gain control circuit comprising a black level detecting unit which detects a black level from a video signal, a white level detecting unit which detects a white level from the video signal, and an analog-to-digital converter which adjusts a dynamic range of the video signal based on a difference value between the black level and the white level, a video signal for adjustment including a black level which indicates a minimum brightness of a video image and a white level which indicates a maximum brightness of the video image is input and the dynamic range is adjusted.

2 Claims, 6 Drawing Sheets

U.S. PATENT DOCUMENTS

| | | | |
|---|---|---|---|
| 2003/0227571 A1* | 12/2003 | Movshovish et al. | 348/691 |
| 2005/0062890 A1* | 3/2005 | Yoshida | 348/572 |
| 2005/0185100 A1* | 8/2005 | Akiyama | 348/678 |
| 2006/0007353 A1* | 1/2006 | Matsutani et al. | 348/441 |
| 2008/0043147 A1* | 2/2008 | Choi | 348/572 |
| 2008/0192131 A1* | 8/2008 | Kim et al. | 348/294 |

FOREIGN PATENT DOCUMENTS

| | | |
|---|---|---|
| JP | 8265667 A | 10/1996 |
| JP | 2005-094678 A | 4/2005 |

OTHER PUBLICATIONS

Japanese Office Action for Application No. 2007-265255, mailed on Aug. 2, 2011 (4 pages).

esp@cenet Patent Abstract for Japanese Publication No. 2005-094678, publication date Apr. 7, 2005. (1 page).

esp@cenet Patent Abstract for Japanese Publication No. 7015684, publication date Jan. 17, 1995. (1 page).

esp@cenet Patent Abstract for Japanese Publication No. 8265667, publication date Oct. 11, 1996. (1 page).

* cited by examiner

BEFORE DYNAMIC RANGE ADJUSTMENT

AFTER DYNAMIC RANGE ADJUSTMENT

BEFORE DYNAMIC RANGE ADJUSTMENT

AFTER DYNAMIC RANGE ADJUSTMENT

AUTOMATIC GAIN CONTROL CIRCUIT IN VIDEO SIGNAL PROCESSING DEVICE

CROSS-REFERENCE TO RELATED APPLICATIONS

The disclosure of Japanese Patent Application No. 2007-265255 including specification, claims, drawings, and abstract is incorporated herein by reference in its entirety.

BACKGROUND OF THE INVENTION

1. Field of the Invention

The present invention relates to an automatic gain control circuit used in processing of a video signal.

2. Description of the Related Art

In a video signal processing device which displays a video signal of NTSC system (composite video signal) as a video image, there is used an automatic gain control circuit which amplifies a video signal to a certain level in an analog-to-digital converter in order to maintain a dynamic range of the brightness of the video image approximately constant.

As shown in FIGS. 3 and 4, a video signal $S_{IN}$ of one field includes a vertical synchronization period $T_V$, a horizontal blanking period $T_H$, and a video signal period $T_S$. The video signal $S_{IN}$ of one horizontal line includes a horizontal blanking period $T_H$, a color burst period $T_C$, and an effective video signal period $T_I$. In FIGS. 3 and 4, in order to simplify explanation, the video signal $S_{IN}$ is displayed with the ratios among periods of the video signal $S_{IN}$ differing from those of the actual video signal $S_{IN}$.

As shown in FIG. 5, an automatic gain control circuit 100 of related art comprises an analog-to-digital converter (A/D converter) 10, a front end block 12, an automatic gain control circuit (AGC circuit) 14, and a pulse width modulation circuit (PWM circuit) 16. A video signal which is input to the A/D converter 10 is converted from an analog signal to a digital signal. In this process, according to a width of a pulse which is input from the PWM circuit 16, the dynamic range of the digital conversion is adjusted. The digitized video signal is output to the front end block 12. At the front end block 12, a pre-process for the video signal is executed. The pre-process includes processes such as, for example, filtering and Γ correction. The video signal passing through the front end block 12 is input to the AGC circuit 14.

The AGC circuit 14 extracts a signal level of the horizontal blanking period $T_H$ of the video signal and outputs the signal level to the PWM circuit 16. The PWM circuit 16 generates a pulse signal having a pulse width which is proportional to the input signal level, and outputs the pulse signal to the R/D converter 10. As shown in FIG. 6A, the A/D converter 10 adjusts the dynamic range according to the pulse width of the pulse signal and digitizes the video signal. In this manner, the level of the video signal is fed back to the A/D converter 10, and the dynamic range of the video signal is maintained approximately constant. Such adjustment of the automatic gain control is executed in an initial adjustment process performed after a manufacturing process of the video signal processing device.

However, as shown in FIG. 6B, the signal level in the horizontal blanking period $T_H$ of the video signal may vary due to an influence of noise or the like. In this case, if the dynamic range of the A/D converter 10 is determined by reference to the signal level of the horizontal blanking period $T_H$, the dynamic range of the video signal cannot be appropriately adjusted.

SUMMARY OF THE INVENTION

According to one aspect of the present invention, there is provided an automatic gain control circuit which receives a video signal including a black level which indicates a minimum brightness of a video image and a white level which indicates a maximum brightness of the video image, the automatic gain control circuit comprising a black level detecting unit which detects the black level from the video signal, a white level detecting unit which detects the white level from the video signal, and an analog-to-digital converter which adjusts a dynamic range of the video signal based on a difference value between the black level and the white level, wherein a signal level of the video signal is automatically adjusted.

BRIEF DESCRIPTION OF THE DRAWINGS

Exemplary embodiment of the present invention will be described in detail by reference to the following figures, wherein.

DESCRIPTION OF THE PREFERRED EMBODIMENT

Figure 1:
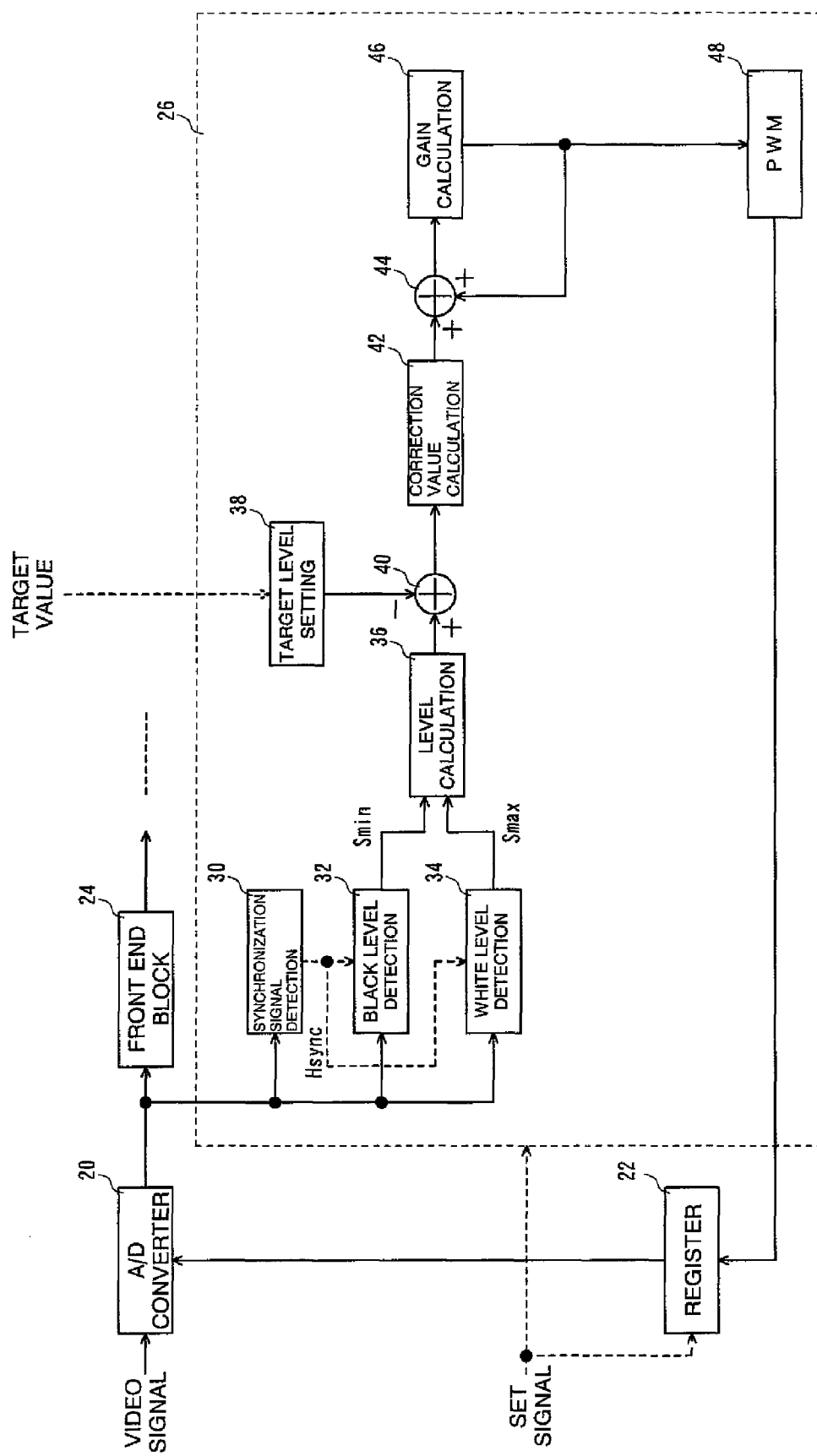
FIG. 1 is a block diagram showing a structure of an automatic gain control circuit in a preferred embodiment of the present invention.

As shown in FIG. 1, an automatic gain control circuit 200 of a preferred embodiment of the present invention comprises an analog-to-digital converter (A/D converter) 20, a register 22, a front end block 24, and a calibration unit 26.

Adjustment of the automatic gain control of the video signal by the automatic gain control circuit 200 is executed during the initial adjustment process performed after the manufacturing process of the video signal processing device. In the initial adjustment process, a set signal is input from the outside to the register 22 and the calibration unit 26 so that the register 22 and the calibration unit 26 are set to an active state.

The A/D converter 20 receives an analog video signal from the outside, converts the analog video signal into a digital signal, and outputs the converted signal. The A/D converter 20 sets a reference voltage for the digital conversion according to a value stored in the register 22, and adjusts the dynamic range of the video signal converted to a digital signal by matching the black level of the video signal to the reference voltage during digital conversion of the video signal.

The front end block 24 receives the video signal converted into the digital signal by the A/D converter 20, and applies a pre-process for the video signal. The pre-process includes processes such as, for example, filtering and Γ correction.

The calibration unit 26 comprises a synchronization signal detecting unit 30, a black level detecting unit 32, a white level detecting unit 34, a level calculating unit 36, a target level setting unit 38, a subtractor 40, a correction value calculating unit 42, an adder 44, a gain calculating unit 46, and a pulse width modulation unit (PWM unit) 48.

The synchronization signal detecting unit 30 receives the video signal from the A/D converter 20, detects the horizontal blacking period $T_H$, and outputs the horizontal synchronization signal Hsync at the detected timing to the black level detecting unit 32 and the white level detecting unit 34.

Figure 2:
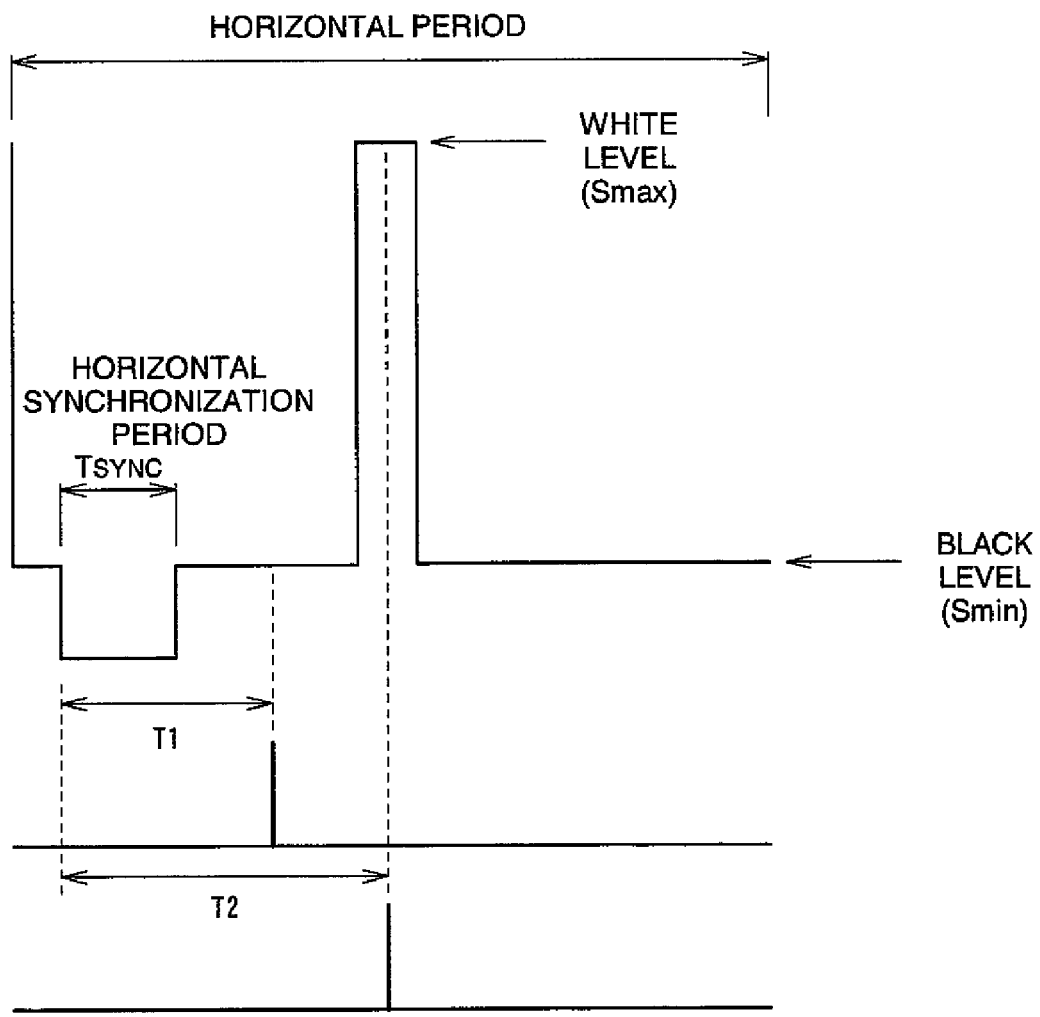
FIG. 2 is a diagram showing a video signal for adjustment in a preferred embodiment of the present invention.
Figure 3:
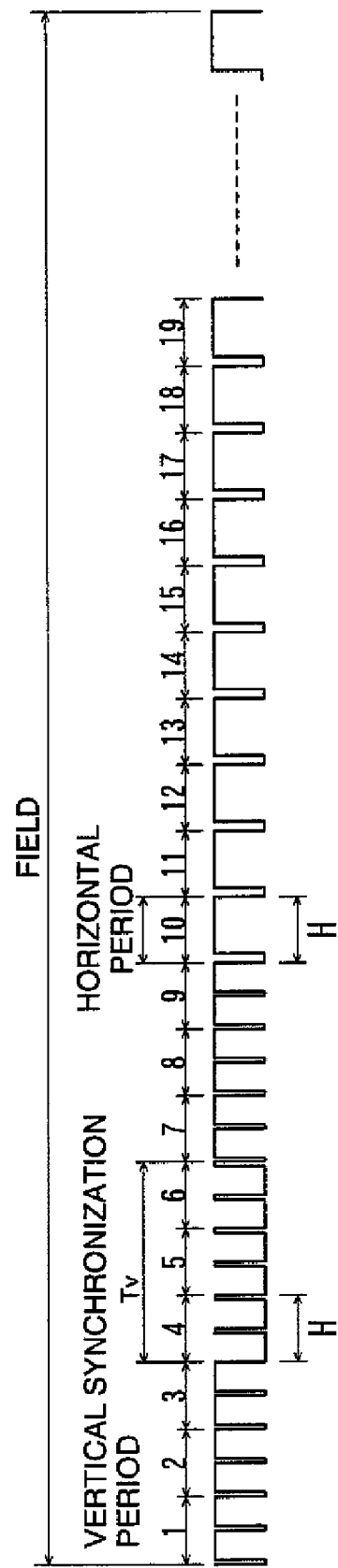
FIG. 3 is a diagram showing a structure of a video signal.
Figure 4:
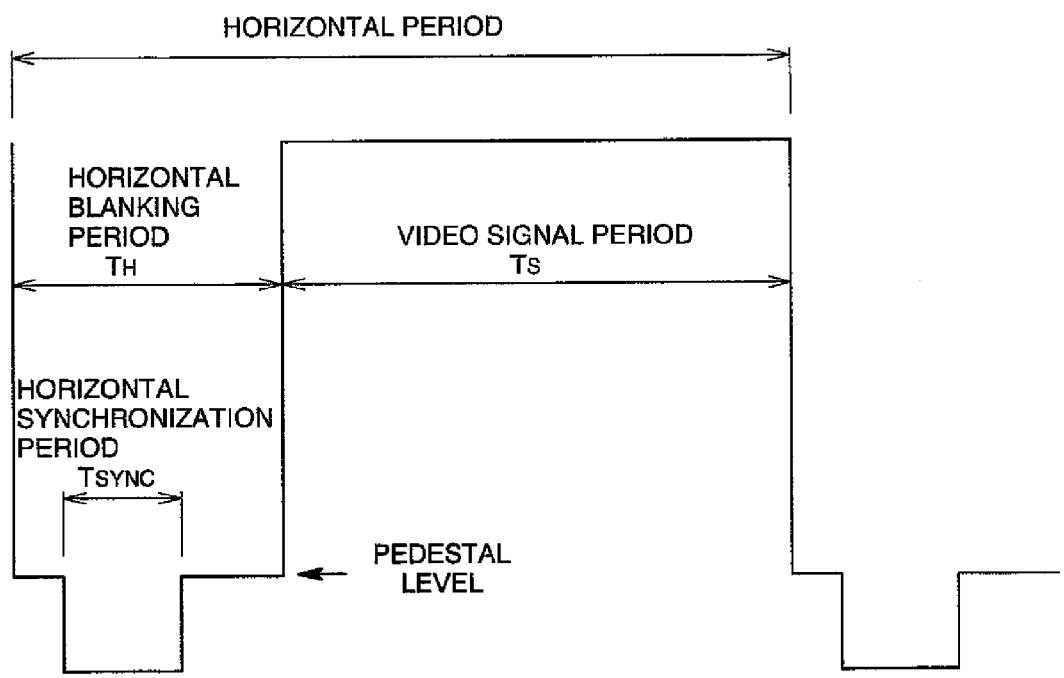
FIG. 4 is a diagram showing a structure of a video signal.
Figure 5:
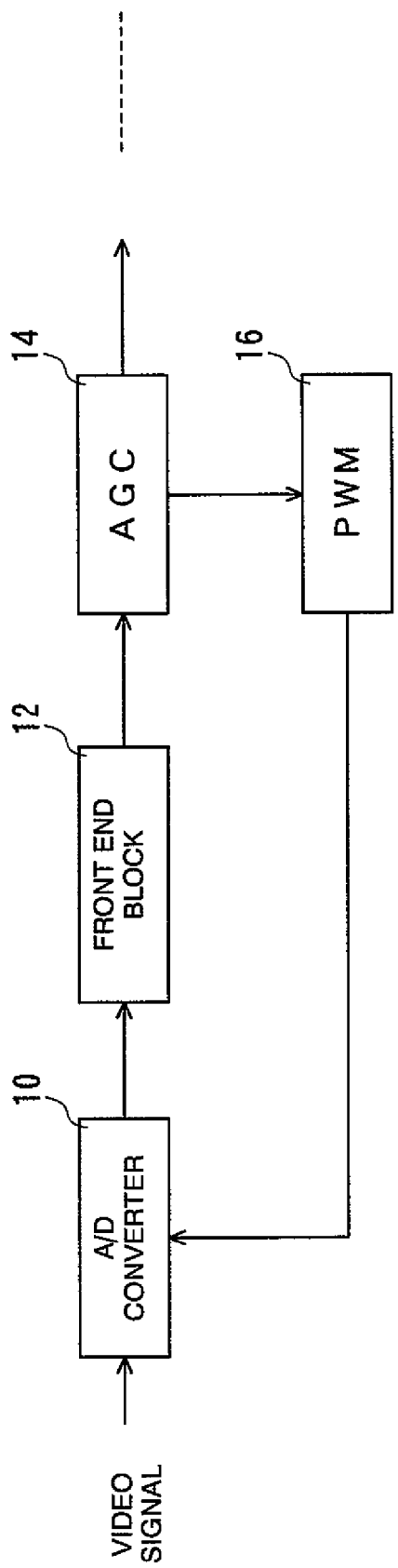
FIG. 5 is a block diagram showing a structure of an automatic gain control circuit in the related art.
Figure 6A:
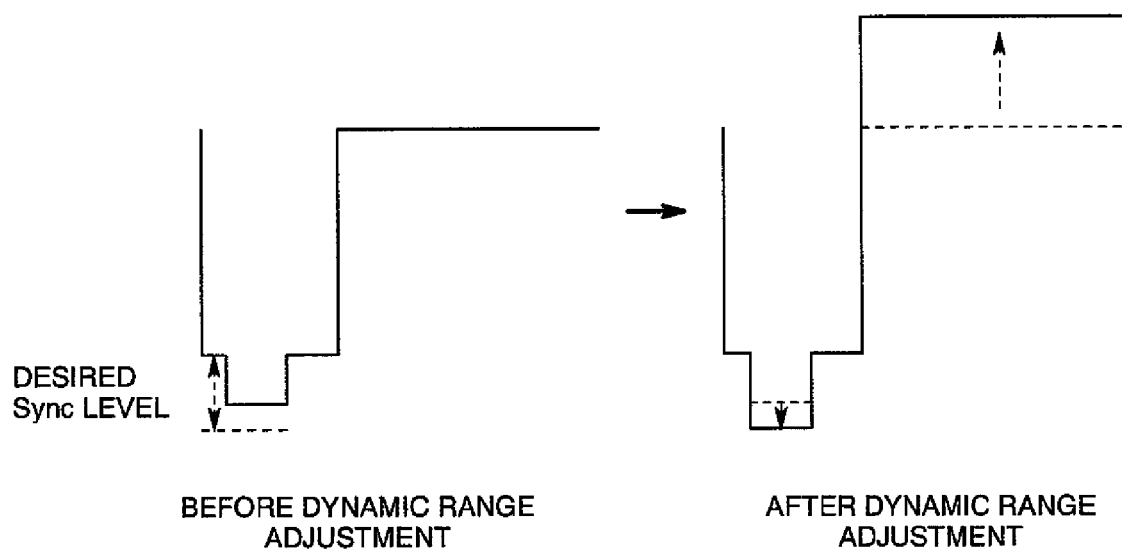
FIG. 6A is a diagram for explaining an automatic gain control process of the related art.
Figure 6B:
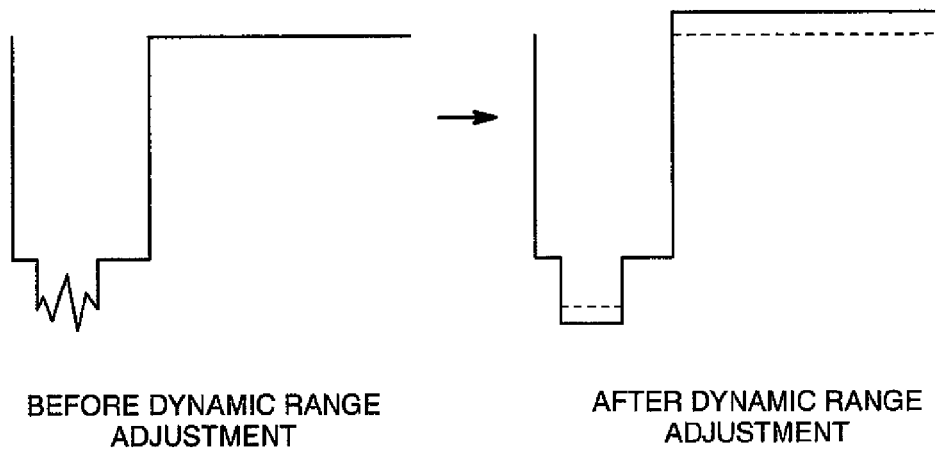
FIG. 6B is a diagram for explaining an automatic gain control process of the related art.

The black level detecting unit 32 receives the video signal from the A/D converter 20, detects a black level which indicates a minimum brightness in the video signal, and outputs as a black level signal to the level calculating unit 36. During adjustment of the dynamic range, a video signal for adjustment is input. As shown in FIG. 2, the video signal for adjustment indicates a minimum brightness Smin and a maximum brightness Smax in the video signal at timings which are predetermined periods T1 and T2 after the horizontal blanking period $T_H$. The black level detecting unit 32 receives the horizontal synchronization signal Hsync from the synchronization signal detecting unit 30, extracts the black level (minimum brightness Smin) from the video signal at a timing which is the time period T1 after the timing of reception of the horizontal synchronization signal Hsync, and outputs a black level signal to the level calculating unit 36.

The white level detecting unit 34 receives the video signal from the A/D converter 20, detects a white level which indicates the maximum brightness in the video signal, and outputs a white level signal to the level calculating unit 36. The white level detecting unit 34 receives the horizontal synchronization signal Hsync from the synchronization signal detecting unit 30, extracts the white level (maximum brightness Smax) from the video signal at a timing which is the time period T2 after the timing of reception of the horizontal synchronization signal Hsync, and outputs the white level signal to the level calculating unit 36.

The level calculating unit 36 detects a difference between the black level signal which is input from the black level detecting unit 32 and the white level signal which is input from the white level detecting unit 34, and outputs the difference to the subtractor 40. The difference value indicates a difference value between the maximum brightness Smax and the minimum brightness Smin of the video signal for adjustment; that is, a dynamic range of the video signal which is currently being output from the A/D converter 20.

The subtractor 40 calculates a difference between the difference value which is output from the level calculating unit 36 and a target value of the dynamic range which is set in the target level setting unit 38, and outputs the difference to the correction value calculating unit 42. In the target level setting unit 38, a target value of the dynamic range required as the video signal to be output from the A/D converter 20 is set in advance. In other words, a difference between the dynamic range of the video signal which is currently being output from the A/D converter 20 and a target value of the dynamic range is input to the correction value calculating unit 42.

The correction value calculating unit 42 receives the output of the subtractor 40, calculates a correction value of the gain corresponding to a difference between the dynamic range of the video signal which is output from the A/D converter 20 and the target value of the dynamic range, and outputs the correction value to the adder 44. The adder 44 calculates a sum of the correction value from the correction value calculating unit 42 and the output of the gain calculating unit 46, and outputs the sum to the gain calculating unit 46. The gain calculating unit 46 determines a new gain value based on the output from the adder 44 and outputs the new gain value to the PWM unit 48. In this manner, in the correction value calculating unit 42, the adder 44, and the gain calculating unit 46, there is determined a new gain value corresponding to the difference between the dynamic range of the video signal which is output from the A/D converter 20 and the target value of the dynamic range.

The pulse width modulation unit 48 receives the gain value from the gain calculating unit 46, generates a pulse signal having a pulse width corresponding to the gain value, and outputs the pulse signal to the register 22. For example, the pulse width modulation unit 48 generates a pulse signal having a pulse width which is proportional to the gain value. The register 22 stores and maintains the pulse width of the pulse signal, and outputs the pulse width to the A/D converter 20.

In this manner, a new gain value corresponding to the difference between the dynamic range of the video signal which is output from the A/D converter 20 and the target value of the dynamic range is fed back to the A/D converter 20, so that the dynamic range during digitization of the video signal gradually reaches the target value.

At the completion of the initial adjustment process, the supply of the set signal from the outside to the register 22 and the calibration unit 26 is stopped, and the register 22 and the calibration unit 26 are set in a non-active state. With this process, the pulse width of the pulse signal corresponding to the gain value which is adjusted in the initial adjustment process is stored and maintained in the register 22, and, after completion of the initial adjustment process, the analog-to-digital conversion by the A/D converter 20 is executed in an ideal dynamic range.

As described, according to the preferred embodiment of the present invention, the dynamic range of the A/D converter can be appropriately adjusted regardless of the level of the horizontal blanking period $T_H$ of the video signal.

What is claimed is:

1. An automatic gain control circuit for receiving a video signal including a black level which indicates a minimum brightness of a video image and a white level which indicates a maximum brightness of the video image more than one time within one horizontal period and automatically adjusting a signal of the video signal, the automatic gain control circuit comprising:
    a black level detecting unit which detects the black level from the video signal;
    a white level detecting unit which detects the white level from the video signal; and
    an analog-to-digital converter which adjusts a dynamic range of the video signal based on a difference value between the black level and the white level;
    a level calculating unit which calculates a difference between the black level detected by the black level detecting unit and the white level detected by the white level detecting unit;
    a subtractor which calculates a difference between the difference calculated by the level calculating unit and a target value of the dynamic range of the video signal; and
    a gain determining unit which determines a target gain based on the difference calculated by the subtractor, wherein
    the analog-to-digital converter adjusts the dynamic range of the video signal based on the target gain determined by the gain determining unit.

2. The automatic gain control circuit according to claim 1, further comprising:
    a pulse width modulation circuit which generates a pulse signal having a pulse width corresponding to the target gain determined by the gain determining unit, wherein
    the analog-to-digital converter adjusts the dynamic range of the video signal based on the pulse width of the pulse signal generated by the pulse width modulation circuit.

* * * * *